(12) United States Patent
Yamashita et al.

(10) Patent No.: US 8,636,451 B2
(45) Date of Patent: Jan. 28, 2014

(54) WHEELCHAIR SECURING DEVICE

(75) Inventors: Makoto Yamashita, Kariya (JP);
Hitoshi Osafune, Takarazuka (JP)

(73) Assignee: Toyota Shatai Kabushiki Kaisha,
Aichi-ken (JP)

( * ) Notice: Subject to any disclaimer, the term of this patent is extended or adjusted under 35 U.S.C. 154(b) by 52 days.

(21) Appl. No.: 13/511,601

(22) PCT Filed: Oct. 14, 2010

(86) PCT No.: PCT/JP2010/068046
§ 371 (c)(1),
(2), (4) Date: Jul. 23, 2012

(87) PCT Pub. No.: WO2011/065140
PCT Pub. Date: Jun. 3, 2011

(65) Prior Publication Data
US 2012/0288344 A1    Nov. 15, 2012

(30) Foreign Application Priority Data

Nov. 26, 2009 (JP) ................................. 2009-268532
Jan. 26, 2010 (JP) ................................. 2010-014283

(51) Int. Cl.
*B60P 7/08* (2006.01)
(52) U.S. Cl.
USPC ........................................................ 410/23

(58) Field of Classification Search
USPC ........... 410/3, 4, 7, 9, 10, 11, 12, 23, 97, 100; 280/304.1; 248/499, 503.1; 296/65.09; 297/DIG. 4
See application file for complete search history.

(56) References Cited

U.S. PATENT DOCUMENTS

2008/0247837 A1 * 10/2008 Cardona ......................... 410/23

FOREIGN PATENT DOCUMENTS

| JP | 08-089532 | 4/1996 |
|---|---|---|
| JP | 11-244332 | 9/1999 |
| JP | 2002-126005 | 5/2002 |
| JP | 2003-146129 | 5/2003 |
| JP | 2005-312630 | 11/2005 |
| JP | 2007-222278 | 9/2007 |

* cited by examiner

*Primary Examiner* — Stephen Gordon
(74) *Attorney, Agent, or Firm* — Christensen Fonder P.A.

(57) ABSTRACT

A wheelchair securing device of the present invention is configured such that in a condition in which a plurality of cord-like retaining members having hooks are respectively drawn from reels and in which the hooks are hooked on a wheelchair, the retaining members are taken up by the reels to secure the wheelchair to a vehicle. The device includes a rotation restraining mechanism that is configured to restrict rotation of the reels using tensions of the retaining members when the retaining members are forced to be drawn from the reels due to an external force applied to the wheelchair.

5 Claims, 8 Drawing Sheets

WHEELCHAIR SECURING DEVICE

PRIORITY CLAIM

The present application is a National Phase entry of PCT Application No. PCT/JP2010/068046, filed Oct. 14, 2010, which claims priority from Japanese Patent Application Number 2009-268532, filed Nov. 26, 2009, and Japanese Patent Application Number 2010-014283, filed Jan. 26, 2010, the disclosures of which are hereby incorporated by reference herein in their entirety.

TECHNICAL FIELD

The present invention relates to a wheelchair securing device that is configured such that in a condition in which a plurality of cord-like retaining members having hooks are respectively drawn from reels and in which the hooks are hooked on a wheelchair, the reels can be rotated in taking-up directions of the retaining members to secure the wheelchair to a vehicle.

BACKGROUND ART

A technique related to the above-described wheelchair securing device is described in Japanese Laid-Open Patent Publication No. 2002-126005.

This wheelchair securing device has reels in four corners. The reels respectively have retaining members of wires that are respectively wound around the reels so as to be took up thereto and drawn therefrom. Further, hooks to be hooked on a wheelchair are attached to distal ends of the retaining members. The reels are respectively biased by spring forces in directions to reeling up the retaining members, so that the retaining members can be reeled out against the spring forces.

Further, the reels respectively have gears that are coaxially secured thereto. The gears are respectively configured to mesh with gears of rotation lock mechanisms of the reels.

According to the construction described above, when the hooks are hooked on the wheelchair after the retaining members are reeled out against the spring forces, tensions can respectively be imparted to the retaining members due to the spring forces. In this condition, when the gears of the rotation lock mechanisms respectively mesh with the gears of the reels by operating the rotation lock mechanisms, the reels can be rotationally locked, so that the wheelchair can be secured in a vehicle cabin of a vehicle.

However, in the above-described wheelchair securing device, the reels can be rotationally locked by operating the rotation lock mechanisms. Therefore, if a user inadvertently fails to operate the rotation lock mechanisms, the reels cannot be rotationally locked. If the vehicle is started to move in a condition in which the reels are not rotationally locked, the retaining members can be reeled out against the spring forces due to a load applied to the wheelchair, so that the wheelchair can possibly move backwards.

In order to prevent this, it is necessary to combine the above-described wheelchair securing device with a wheelchair securing device described in, for example, Japanese Laid-Open Patent Publication No. 8-89532.

The wheelchair securing device described in Japanese Laid-Open Patent Publication No. 8-89532 has a retractor that is capable of taking up and paying out a belt. A hook to be hooked on a wheelchair is attached to a distal end of the belt. Also, the retractor has a lock mechanism that is configured to prohibit the belt from being drawn from the retractor when the belt is forced to be drawn therefrom with a force greater than a predetermined force. As a result, even if the wheelchair is pressed to move by, for example, start of the vehicle, the belt can be prohibited from being paid out due to action of the lock mechanism of the retractor, so that the wheelchair can be prevented from moving.

However, in a construction in which the wheelchair securing device described in Patent Document 1 and the wheelchair securing device described in Patent Document 2 are combined with each other, the wheelchair securing device can be increased in size. This is not desirable for use in the vehicle.

Thus, there is a need in the art to provide an improved wheelchair seatbelt device.

SUMMARY OF THE INVENTION

A first aspect of the present invention may provide a wheelchair securing device that is configured such that in a condition in which a plurality of cord-like retaining members having hooks are respectively drawn from reels and in which the hooks are hooked on a wheelchair, the reels are rotated in taking-up directions of the retaining members to secure the wheelchair to a vehicle, which may include a rotation restraining mechanism that is configured to restrict rotation of the reels using a tension of the retaining member when the wheelchair receives a force caused by acceleration of the vehicle and forces the retaining members to be drawn from the reels.

According to the first aspect of the present invention, the rotation restraining mechanism can restrict the rotation of the reels using the tension of the retaining member when the wheelchair receives the force caused by acceleration of the vehicle and forces the retaining members to be drawn from the reels. That is, in a case in which a user fails to perform a rotation lock operation of the reels, even if the wheelchair is pressed to move backwards by sudden start of the vehicle or other such actions, the rotation restraining mechanism can rotationally restrict the reels due to the tension of the retaining member that is pulled by the wheelchair. As a result, the retaining members can be prevented from being drawn from the reels, so that the backward movement of the wheelchair can be prohibited.

Further, because the rotation restraining mechanism is constructed to restrict the rotation of the reels by utilizing the tension of the retaining member, it is not necessary to provide additional devices for prohibiting the wheelchair from moving in addition to the wheelchair securing device. Thus, the device can be avoided from being increased in size.

According to a second aspect of the present invention, in the condition in which a plurality of cord-like retaining members are respectively drawn from the reels and in which the hooks are hooked on the wheelchair, the reels are rotated in the taking-up directions of the retaining members and then are rotationally locked to secure the wheelchair to the vehicle.

According to a third aspect of the present invention, the reels have reel gears that are positioned coaxially therewith and are integrated therewith. The reel gears are connected to a motor via a rotative force transmission mechanism. When the motor is actuated, the reels are rotated in taking-up directions of the retaining members. When the motor is stopped, the reels are rotationally locked. When connection of the reel gears and the motor via the rotative force transmission mechanism is released, the reels can be rotationally unlocked.

According to a fourth aspect of the present invention, the rotation restraining mechanism includes a slide member having a teeth portion that is capable of meshing with the reel gears, and configured to be slidable between a mesh position and a retract position, a spring member biasing the slide member toward the retract position, and a hooking portion formed in the slide member and configured such that the retaining members can be hooked thereon. In a condition in which the retaining member is applied with the tension greater than a spring force of the spring member, the slide member slides toward the mesh position against the spring force of the spring member due to the tension of the retaining member, so that the teeth portion can mesh with the reel gear to rotationally restrict the reels.

Thus, because the rotation restraining mechanism is constructed to restrict the rotation of the reels by meshing the teeth portion of the slide member with the reel gear, the reels can be effectively rotationally restricted in a condition in which the retaining member is applied with the tension greater than the spring force of the spring member.

According to a fifth aspect of the present invention, the wheelchair securing device further includes a sliding pulley to which an intermediate portion of the left retaining member and an intermediate portion of the right retaining member are applied from opposite directions, the sliding pulley being configured to slide to the right when the tension of the right retaining member is greater than the tension of the left retaining member and to slide to the left when the tension of the left retaining member is greater than the tension of the right retaining member, a reel that is configured to taking up one of the right and left retaining members, and a securing member for securing a proximal end portion of the other of the right and left retaining members to the vehicle.

Thus, for example, in a case in which the proximal end portion of the left retaining member is secured to the vehicle by the securing member and in which the right retaining member is taken up by the reel, when the reel is rotated in a taking-up direction while the right and left hooks are hooked on the wheelchair, the sliding pulley is pulled to the right by the tension when the right retaining member is drawn. As a result, the sliding pulley slides to the right, so that the left retaining member is drawn. That is, when the reel is rotated in the taking-up direction, the right retaining member is drawn, and the sliding pulley is pulled to the right by the tension of the right retaining member, so that the left retaining member can be drawn. Further, the reel stops after it is rotated by a predetermined angle. As a result, the sliding pulley is maintained in a position in which the tensions of the right and left retaining members are equal to each other, so that the wheelchair can be secured to the vehicle.

That is, in a condition in which the wheelchair is secured to the vehicle, the tensions of the right and left retaining members can be equal to each other, so that the wheelchair can be secured to the vehicle from the right and left in a well-balanced manner.

Further, this also applies to a case in which the proximal end portion of the right retaining member is secured to the vehicle and in which the left retaining member is taken up by the reel.

According to a sixth aspect of the present invention, the sliding pulley includes a first pulley portion to which one of the right and left retaining members is applied and a second pulley portion to which the other of the right and left retaining members is applied. The first and second pulley portions are superimposed and coaxially connected together.

Thus, the right and left retaining members applied to the sliding pulley cannot interfere with each other.

According to a seventh aspect of the present invention, the wheelchair securing device further includes a securing mechanism that is configured to secure the sliding pulley to the vehicle so as to unslidably retain the same.

Thus, in a condition in which the wheelchair is secured in position by the wheelchair securing device, if one of the tensions of the right and left retaining members can be greater than the other by, for example, abrupt turn of the vehicle, the sliding pulley can be prevented from moving.

According to the present invention, even when the user fails to rotationally lock the reels, the wheelchair can be prevented from moving by, for example, sudden acceleration of the vehicle, thereby improving safety. Further, there is no need to separately provide any additional devices configured to prohibit the wheelchair from moving in order to increase safety, so that the device can be prevented from being increased in size.

BRIEF DESCRIPTION OF THE DRAWINGS

FIG. 4 (B) is a plan view illustrating an operation of the rotation restraining mechanism;

FIG. 8 (B) is a longitudinal sectional view taken along line B-B of FIG. 8 (A);

DETAILED DESCRIPTION OF THE INVENTION

Embodiment 1

Figure 1:
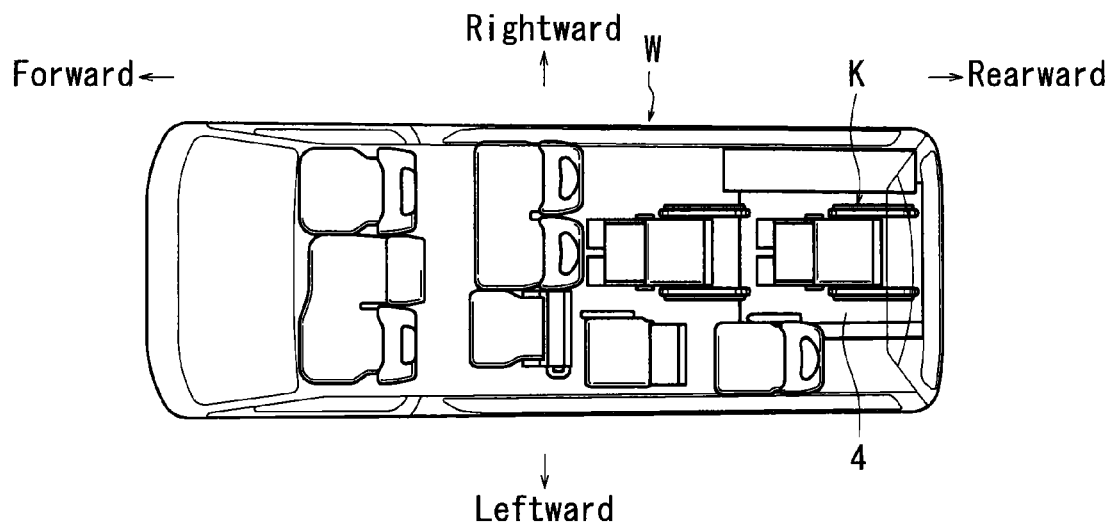
FIG. 1 is a plan view of a vehicle cabin of a vehicle having a wheelchair securing device according to Embodiment 1 of the present invention.

In the following, a wheelchair securing device according to Embodiment 1 of the present invention will be described with reference to FIGS. 1 to 4. The wheelchair securing device according to the present embodiment is a device for securing a wheelchair to a floor portion in a vehicle cabin of a vehicle.

Further, forward and rearward, rightward and leftward, and upward and downward in the drawings respectively correspond to forward and rearward, rightward and leftward, and upward and downward of the vehicle. Further, forward and rearward, rightward and leftward, and upward and downward referred to in the specification also correspond to forward and rearward, rightward and leftward, and upward and downward of the vehicle.

<Outline of Wheelchair Securing Device 10>

Figure 2:
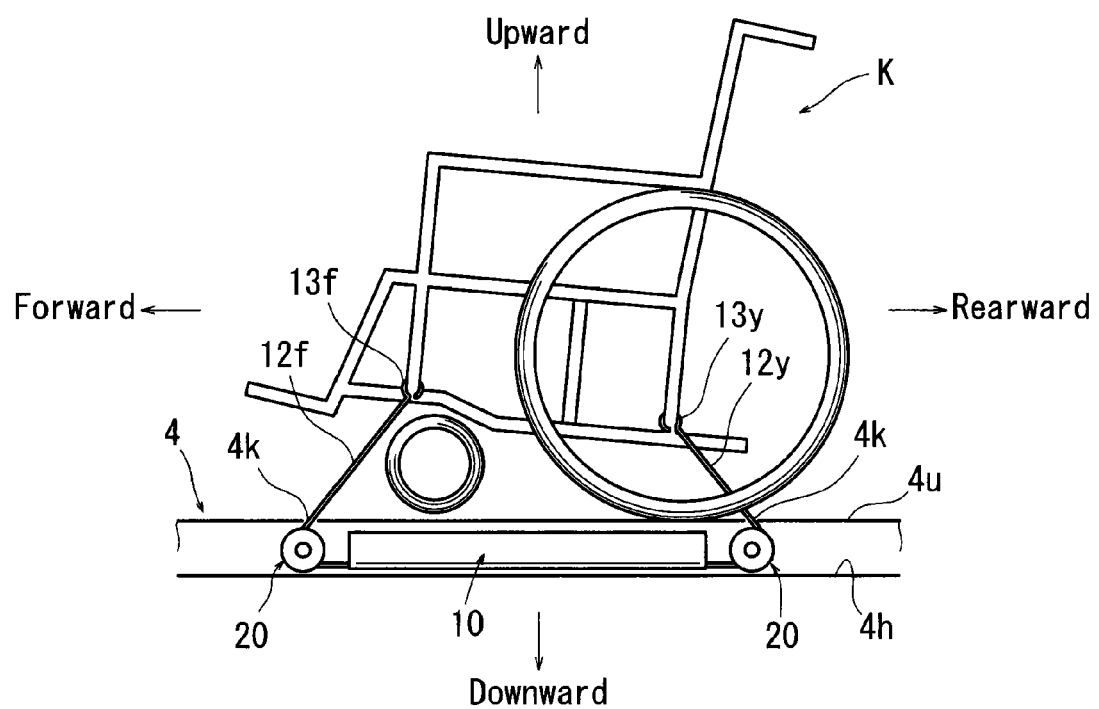
FIG. 2 is a schematic side view illustrating an operation of the wheelchair securing device according to Embodiment 1 of the present invention.

A wheelchair securing device 10 is a device for securing a wheelchair K to a floor position in a vehicle cabin of a vehicle W. As shown in FIG. 2, the wheelchair securing device 10 is received in a platform 4 of a wheelchair lifter (not shown) that is disposed in a floor portion of the vehicle cabin. That is, formed in a predetermined position of the platform 4 is a recess 4h capable of receiving the wheelchair securing device 10 therein. An opening of the recess 4h is configured to be covered by a platform surface 4u.

Further, it is also possible to form a recess (not shown) capable of receiving the wheelchair securing device 10 therein in a predetermined position of the floor portion of the vehicle cabin, so that an opening of the recess can be covered by a floor plate.

Figure 3:
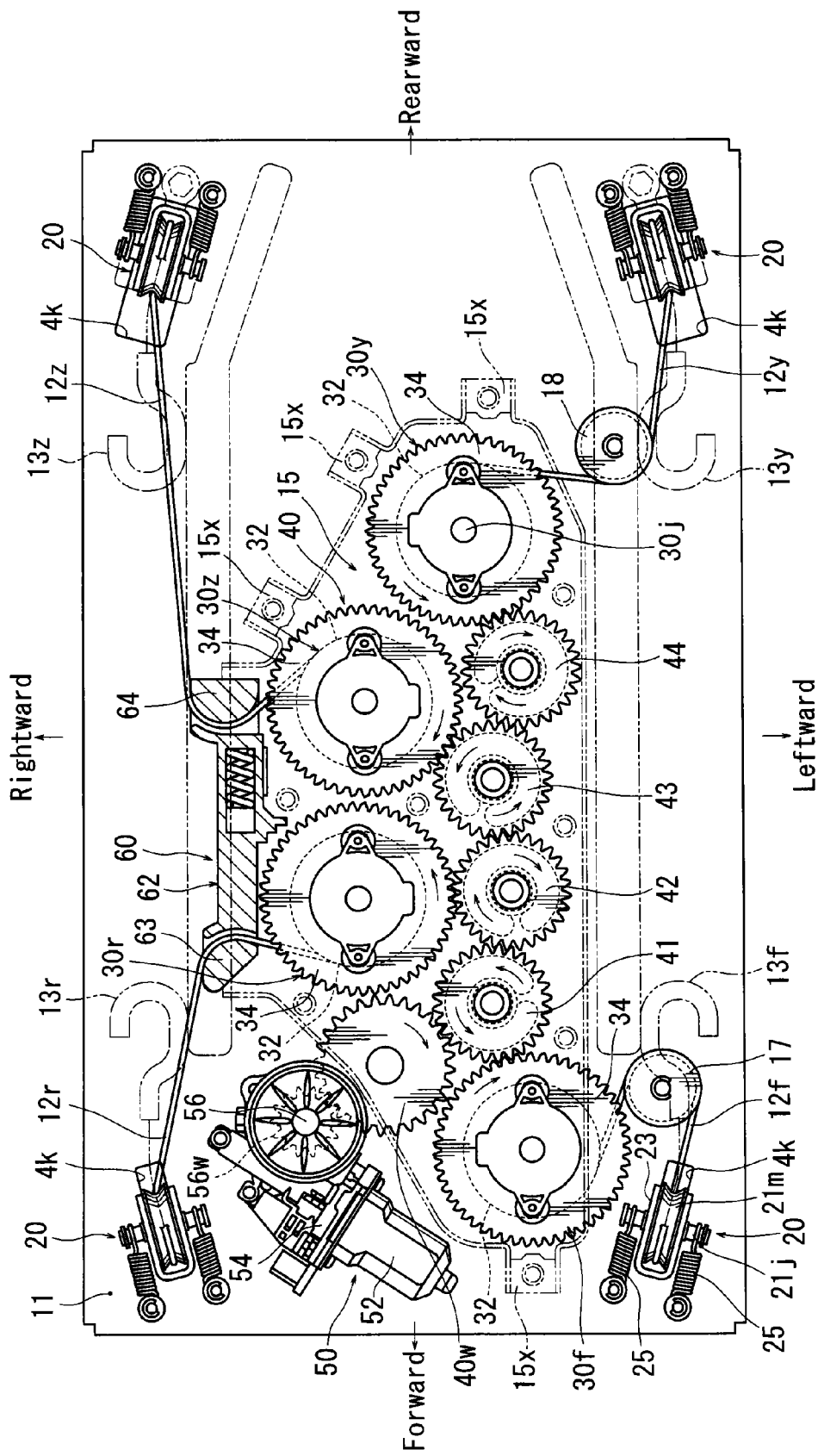
FIG. 3 is a plan view of the wheelchair securing device according to Embodiment 1 of the present invention.

As shown in FIG. 3, the wheelchair securing device 10 has a rectangular base 11 that is elongated in a longitudinal direction of the vehicle. The wheelchair securing device 10 further includes four sets of reels 30f, 30r, 30y and 30z, a gear mechanism 40 and a drive portion 50, and a rotation restraining mechanism 60 that are positioned in a substantially central position of the base 11. The reels 30f, 30r, 30y and 30z are respectively configured to be capable of taking up and paying out front, rear, right and left wires 12f, 12r, 12y and 12z. The gear mechanism 40 and the drive portion 50 are constructed to be capable of rotating the reels 30f, 30r, 30y and 30z in taking-up directions and capable of rotationally locking the same. The rotation restraining mechanism 60 is configured to restrict rotation of the reels 30f, 30r, 30y and 30z when tensions greater than predetermined values are applied to the wires 12f, 12r, 12y and 12z in a condition in which rotation lock of the reels 30f, 30r, 30y and 30z is released.

The left front side wire 12f is a wire that is connected to a left front portion of the wheelchair K so as to restrict backward movement of the wheelchair K. As shown in FIG. 3, the left front side wire 12f is drawn from the left front reel 30f and is then applied to a front horizontal pulley 17. Thereafter, the left front side wire 12f is applied to a pulley portion 20 provided on a left front portion of the base 11 and is then pulled out upwardly from an upper side of the platform surface 4u (FIG. 2).

The right front side wire 12r is a wire that is connected to a right front portion of the wheelchair K so as to restrict the backward movement of the wheelchair K. The right front side wire 12r is drawn from the right front reel 30r and is then applied to a front side hooking portion 63 of a slide member 62 of the rotation restraining mechanism 60, which will be hereinafter described. Thereafter, the right front side wire 12r is applied to a pulley portion 20 provided on a right front portion of the base 11 and is then pulled out upwardly from the upper side of the platform surface 4u.

The left rear side wire 12y is a wire that is connected to a left rear portion of the wheelchair K so as to restrict forward movement of the wheelchair K. The left rear side wire 12y is drawn from the left rear reel 30y and is then applied to a rear horizontal pulley 18. Thereafter, the left rear side wire 12y is applied to a pulley portion 20 provided on a left rear portion of the base 11 and is then pulled out upwardly from the upper side of the platform surface 4u.

The right rear side wire 12z is a wire that is connected to a right rear portion of the wheelchair K so as to restrict the forward movement of the wheelchair K. The right rear side wire 12z is drawn from the right rear reel 30z and is then applied to a rear side hooking portion 64 of the slide member 62 of the rotation restraining mechanism 60. Thereafter, the right rear side wire 12z is applied to a pulley portion 20 provided on a right rear portion of the base 11 and is then pulled out upwardly from the upper side of the platform surface 4u.

<Regarding Pulley Portions 20>

As shown in FIG. 2, the pulley portions 20 are disposed under rectangular openings 4k formed in the platform surface 4u. The pulley portions 20 are pulleys that enables the horizontally drawn wires 12f, 12r, 12y and 12z to be pulled out obliquely upwards through the rectangular openings 4k of the platform surface 4u. Further, hooks 13f, 13r, 13y and 13z (shown by chain double-dashed lines in FIG. 3) to be hooked on the wheelchair K are respectively secured to distal ends of the wires 12f, 12r, 12y and 12z. The hooks 13f, 13r, 13y and 13z are positioned on the platform surface 4u.

As shown in FIG. 3, the pulley portions 20 are composed of pulley main body portions 21m, bearing portions 23 and springs 25. The pulley main body portions 21m are rotatably supported by central shafts 21j. The bearing portions 23 are formed as support bases positioned on the base 11 and are configured to horizontally support the central shafts 21j of the pulley main bodies 21m in elongated holes (not shown) formed therein. The springs 25 are configured to pull the central shafts 21j of the pulley main bodies 21m in reverse directions with respect to the wires 12f, 12r, 12y and 12z, so as to maintain tensions applied to the wires 12f, 12r, 12y and 12z substantially constant.

The wires 12f, 12r, 12y and 12z correspond to retaining members of the present invention.

<Regarding Reels 30f, 30r, 30y and 30z>

The front, rear, right and left reels 30f, 30r, 30y and 30z are respectively composed of disc-shaped reel main bodies 32 that are capable of taking up and paying out the wires 12f, 12r, 12y and 12z, and reel gears 34 that are positioned coaxially with the reel main bodies 32. The reel main bodies 32 and the reel gears 34 are respectively integrated with each other in rotating directions. The left front reel 30f is positioned on the base 11 in the vicinity of the left front pulley portion 20 while it is arranged parallel to the base 11. The left front reel 30f is constructed to take up the wire 12f due to right rotation thereof.

Similarly, the right front reel 30r is positioned on the base 11 in a right central portion thereof (behind the right front pulley portion 20) while it is arranged parallel to the base 11. The right front reel 30r is constructed to take up the wire 12r due to left rotation thereof. The left rear reel 30y is positioned on the base 11 in the vicinity of the left rear pulley portion 20 while it is arranged parallel to the base 11. The left rear reel 30f is constructed to take up the wire 12y due to left rotation thereof. The right rear reel 30z is positioned on the base 11 behind the right front reel 30r while it is arranged parallel to the base 11. The right rear reel 30z is constructed to take up the wire 12z due to right rotation thereof.

Lower ends of rotation center shafts 30j of the front, rear, right and left reels 30f, 30r, 30y and 30z are fitted into bearing holes (not shown) formed in the base 11. Conversely, upper ends of rotation center shafts 30j are respectively fitted into bearing holes (not shown) formed in a gear bracket 15 (chain double-dashed line) that is provided parallel to the base 11. Further, the gear bracket 15 has leg-shaped support portions 15x that are formed in a plurality of positions on a circumferential periphery thereof. The support portion 15x are bolted on the base 11.

<Regarding Gear Mechanism 40 and the Drive Portion 50>

The drive portion 50 has a motor 52, and a speed reduction mechanism 54 that is capable of amplifying a rotative force of the motor 52.

The drive portion 50 is securely connected to the base 11 such that an output shaft 56 thereof can be vertically directed. The output shaft 56 has an output gear 56w attached thereto. The output gear 56w meshes with an input gear 40w of the gear mechanism 40.

The gear mechanism 40 is a mechanism for transmitting a rotative force of the output shaft 56 of the drive portion 50 to the front, rear, right and left reels 30f, 30r, 30y and 30z, and is composed of the input gear 40w previously described, a first gear 41, a second gear 42, a third gear 43 and a fourth gear 44. Further, the input gear 40w, the first gear 41, the second gear 42, the third gear 43 and the fourth gear 44 are rotatably held horizontally between the base 11 and the gear bracket 15. Further, the first gear 41, the second gear 42, the third gear 43 and the fourth gear 44 are provided with clutch mechanisms (not shown) for enabling and disabling the transmission of the rotative force.

As shown in FIG. 3, the input gear 40w of the gear mechanism 40 meshes with the first gear 41. The first gear 41 meshes with the reel gear 34 of the left front reel 30f and the second gear 42. The second gear 42 meshes with the reel gear 34 of the right front reel 30r and the third gear 43. The third gear 43 meshes with the reel gear 34 of the right rear reel 30z and the fourth gear 44. The fourth gear 44 meshes with the reel gear 34 of the left rear reel 30y.

According to the construction described above, when the drive portion 50 is actuated to rotate the input gear 40w of the gear mechanism 40 to the right, as shown by arrows in FIG. 3, the first gear 41 rotates to the left, the second gear 42 rotates to the right, the third gear 43 rotates to the left, and the fourth gear 44 rotates to the right. As a result, the reel gears 34 (the reel main bodies 32) of the front, rear, right and left reels 30f, 30r, 30y and 30z meshing with the first to fourth gears 41, 42, 43 and 44 can respectively rotate in the taking-up directions of the wires 12f, 12r, 12y and 12z.

Further, the first to fourth gears 41, 42, 43 and 44 are gears of the same teeth number. Also, the reel gears 34 of the front, rear, right and left reels 30f, 30r, 30y and 30z are gears of the same teeth number. Therefore, upon actuation of the drive portion 50, the front, rear, right and left reels 30f, 30r, 30y and 30z can rotate at the same speed in the taking-up directions. Thereafter, when the front, rear, right and left wires 12f, 12r, 12y and 12z are taken up to limit positions thereof and then rotation torque applied to the motor 52 of the drive portion 50 reaches a predetermined value, the motor 52 stops, so that the front, rear, right and left reels 30f, 30r, 30y and 30z can be rotationally locked. Further, when the clutch mechanisms of the first to fourth gears 41, 42, 43 and 44 are moved toward positions disabling the transmission of the rotative force and are positioned therein, the rotation lock of the front, rear, right and left reels 30f, 30r, 30y and 30z is released. As a result, the gear mechanism 40 is changed to a free condition, so the wires 12f, 12r, 12y and 12z can be drawn.

The drive portion 50, the clutch mechanisms, and the gear mechanism 40 correspond to a rotative force transmission mechanism of the present invention.

<Regarding Rotation Restraining Mechanism 60>

The rotation restraining mechanism 60 is a mechanism that restricts rotation of the front, rear, right and left reels 30f, 30r, 30y and 30z when the tension greater than the predetermined value is applied to the right front wire 12r in the condition in which the rotation lock of the reels 30f, 30r, 30y and 30z is released and in which the reels 30f, 30r, 30y, and 30z are placed in free conditions.

Figure 4:
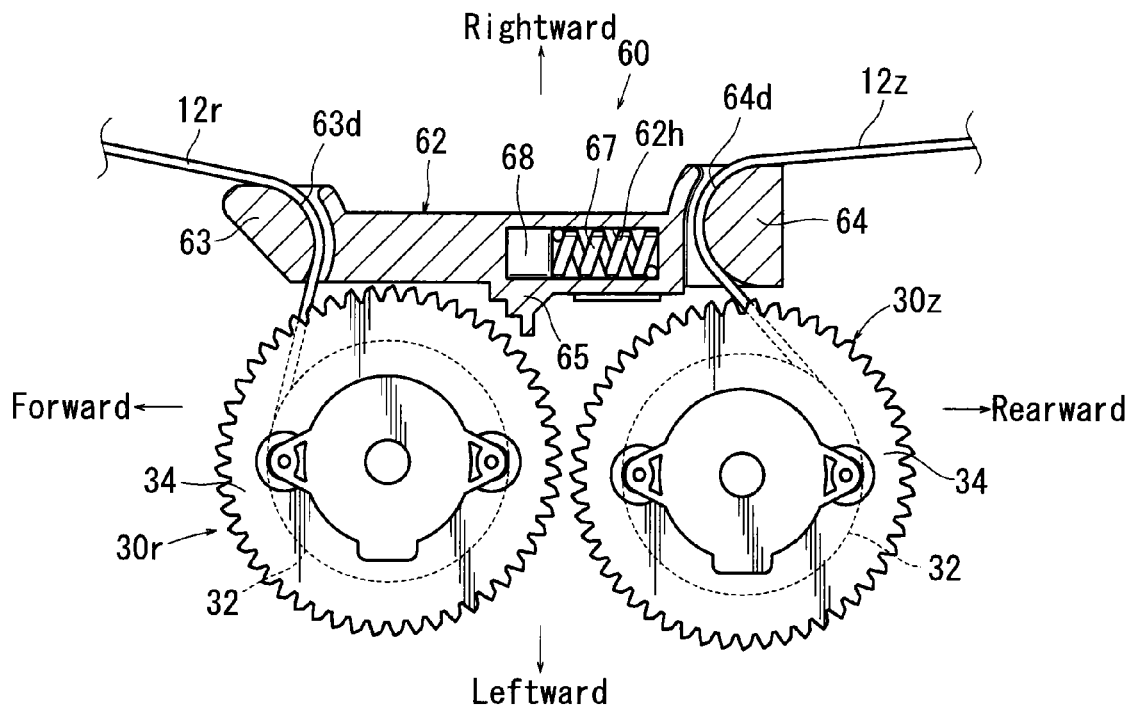
FIG. 4 (A) is a plan view of a rotation restraining mechanism of the wheelchair securing device.
Figure 4:
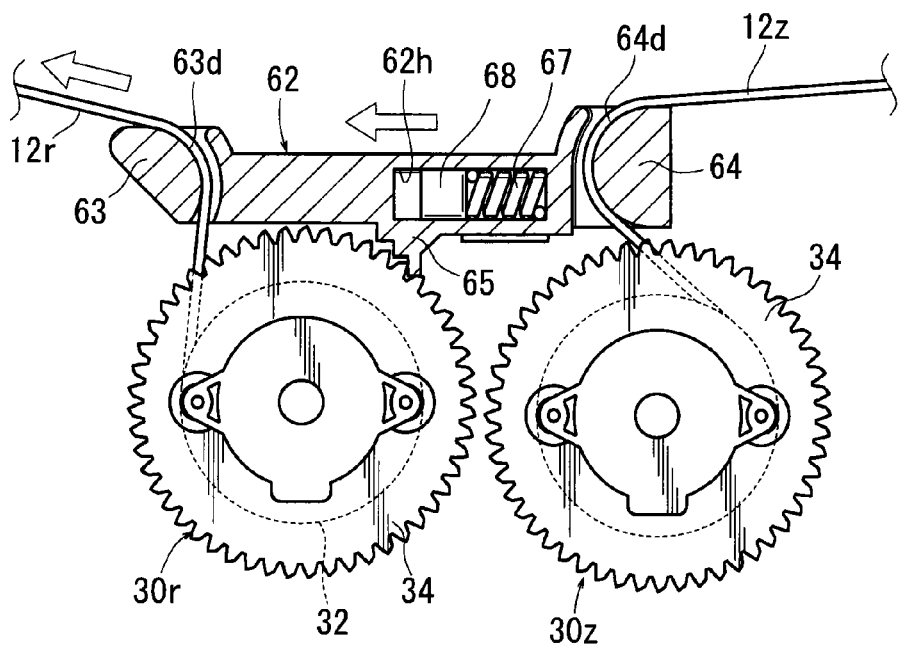

As shown in the enlarged view of FIG. 4 (A), the rotation restraining mechanism 60 has a slide member 62. The slide member 62 is a longitudinally elongated plate-shaped member that is positioned on the right side of the right front reel 30r and of the right rear reel 30z. The slide member 62 is horizontally disposed between the base 11 and the gear bracket 15 so as to be longitudinally slidable. The slide member 62 has the front side hooking portion 63 that is formed in a front upper surface thereof. The front side hooking portion 63 is configured such that the wire 12r drawn from the right front reel 30r rightwardly and rearwardly can be hooked thereon. The front side hooking portion 63 has a receiving surface 63d having a substantially arcuate shape in plan view. The receiving surface 63d is formed in a portion on which the wire 12r is hooked. Therefore, the wire 12r can be curved gently by approximately 90 degrees by action of the receiving surface 63d. Further, the slide member 62 has the rear side hooking portion 64 that is formed in a rear upper surface thereof. The rear side hooking portion 64 is configured such that the wire 12z drawn from the right rear reel 30z rightwardly and forwardly can be hooked thereon. The rear side hooking portion 64 has a receiving surface 64d having a substantially arcuate shape in plan view. The receiving surface 64d is formed in a portion on which the wire 12z is hooked. Therefore, the wire 12z can be curved gently by approximately 50 degrees by action of the receiving surface 64d.

Further, the slide member 62 has a teeth portion 65 that is formed in a left side portion thereof, so as to horizontally laterally protrude therefrom. The teeth portion 65 is capable of meshing with the reel gear 34 of the right front reel 30r when the slide member 62 slides to a forward movement limit position.

The slide member 62 has a longitudinally elongated rectangular opening 62h that is formed in a substantially central portion thereof. A spring shoe pin 68 securely connected to the base 11 is introduced into the rectangular opening 62h. Further, attached between the spring shoe pin 68 and a rear end wall of the rectangular opening 62h of the slide member 62 is a spring member 67 that is capable of biasing the slide member 62 toward a rearward movement limit position.

Thus, the slide member 62 is normally maintained in the rearward movement limit position by a spring force of the spring member 67, so that the teeth portion 65 of the slide member 62 is spaced away from the reel gear 34 of the right front reel 30r. However, as shown in FIG. 4 (B), when large tension is applied to the right front wire 12r and then the slide member 62 advances to the forward movement limit position against the spring force of the spring member 67, the teeth portion 65 of the slide member 62 can mesh with the reel gear 34 of the right front reel 30r. As a result, the right front reel 30r and the left front, right rear and left rear reels 30f, 30y and 30z that are connected to the right front reel 30r via the gear mechanism 40 can be rotationally restricted.

Further, the spring force of the spring member 67 is appropriately set a magnitude that is capable of maintaining the slide member 62 in the rearward movement limit position when a user draws out the wires 12f, 12r, 12y and 12z from the reels 30f, 30r, 30y and 30z.

The forward movement limit position of the slide member 62 corresponds to a mesh position of the present invention. The rearward movement limit position of the slide member 62 corresponds to a retract position of the present invention.

<Regarding Operation of Wheelchair Securing Device 10>

Next, an operation of the wheelchair securing device 10 described above will be described.

First, in a condition in which the wheelchair K is positioned in a predetermined position on the platform surface 4u, the front, rear, right and left wires 12f, 12r, 12y and 12z are drawn from the wheelchair securing device 10 of which the rotation lock is released. Thereafter, the hooks 13f, 13r, 13y and 13z of the wires 12f, 12r, 12y and 12z are respectively hooked on the front, rear, right and left portions of the wheelchair K. Subsequently, in this condition, a take-up switch (not shown) provided to the vehicle W is operated. As a result, the drive portion 50 is actuated, so that the output gear 56w of the drive portion 50 can rotate the input gear 40w, the first gear 41, the second gear 42, the third gear 43 and the fourth gear 44 of the gear mechanism 40. Thus, the front, rear, right and left reels 30f, 30r, 30y and 30z can rotate in the taking-up directions. When the front, rear, right and left wires 12f, 12r, 12y and 12z are taken up to the limit positions thereof and then the rotation torque applied to the motor 52 of the drive portion 50 reaches the predetermined value, the motor 52 stops, so that the front, rear, right and left reels 30f, 30r, 30y and 30z can be rotationally locked. In this condition, the wheelchair K is constrained from front, rear, right and left sides thereof by the wires 12f, 12r, 12y and 12z, so that securing of the wheelchair K can be completed.

Conversely, in order to release the securing of the wheelchair K, after the rotation lock of the wheelchair securing device 10 is released, the front, rear, right and left wires 12f, 12r, 12y and 12z are drawn from the reels 30f, 30r, 30y and 30z. Thus, the hooks 13f, 13r, 13y and 13z of the wires 12f, 12r, 12y and 12z can be detached from the wheelchair K.

<Regarding Operation of the Rotation Restraining Mechanism 60>

Further, there is a case in which the user fails to operate the take-up switch (not shown) of the vehicle W in the condition in which the hooks 13f, 13r, 13y and 13z of the wires 12f, 12r, 12y and 12z provided on the front, rear, right and left portions of the wheelchair securing device 10 are respectively hooked on the wheelchair K. Next, such a case will be described.

If the wheelchair K is disposed in the vehicle cabin in this condition, when, for example, the vehicle W is abruptly accelerated during traveling of the vehicle W, the wheelchair K can be subjected to a rearward load. At this time, because the rotation lock of the wheelchair securing device 10 is released, the wires 12f and 12r can be pulled by the wheelchair K, so as to be forced to be drawn from the left front reel 30f and the right front reel 30r. As shown in FIG. 4 (B), when the wire 12r is forced to be drawn from the right front reel 30r, the slide member 62 of the rotation restraining mechanism 60 can be pulled forwards against the spring force of the spring member 67 due to a tensile force of the wire 12r, so as to slide forwards. As a result, the slide member 62 advances to the mesh position, so that the teeth portion 65 can mesh with the reel gear 34 of the right front reel 30r. As a result, the right front reel 30r and the left front, right rear and left rear reels 30f, 30y and 30z that are connected to the right front reel 30r via the gear mechanism 40 can be rotationally restricted. Thus, the wires 12f, 12r, 12y and 12z can be prevented from being drawn from the reels 30f, 30r, 30y and 30z, so that the backward movement of the wheelchair K can be restricted.

<Advantages of Wheelchair Securing Device 10 According to the Present Embodiment>

In the wheelchair securing device 10 according to the present embodiment, the rotation restraining mechanism 60 can rotationally restrict the reels 30f, 30r, 30y and 30z using the tension of the wire 12r when the wheelchair K receives a force caused by acceleration of the vehicle and then the wires 12f, 12r, 12y and 12z are forced to be drawn from the reels 30f, 30r, 30y and 30z in the condition in which the rotation lock of the reels 30f, 30r, 30y and 30z is released. That is, in the case in which the user fails to perform a rotation lock operation of the wheelchair securing device 10, even if the wheelchair is pressed to move backwards by sudden start of the vehicle W or other such actions, the rotation restraining mechanism 60 can rotationally restrict the reels 30f, 30r, 30y and 30z due to the tension of the wire 12r that is pulled by the wheelchair K. As a result, the wires 12f, 12r, 12y and 12z can be prevented from being drawn from the reels 30f, 30r, 30y and 30z, so that the backward movement of the wheelchair K can be prohibited. Thus, the wheelchair securing device 10 may have improved safety.

Further, because the rotation restraining mechanism 60 is constructed to restrict the rotation of the reels 30f, 30r, 30y and 30z by utilizing the tension of the wire 12r, it is not necessary to provide additional devices for prohibiting the wheelchair K from moving in addition to the wheelchair securing device 10. Thus, the device can be avoided from being increased in size.

Further, because the rotation restraining mechanism 60 is constructed to restrict the rotation of the reels 30f, 30r, 30y and 30z by meshing the teeth portion 65 of the slide member 62 with the reel gear 34, the reels 30f, 30r, 30y and 30z can be effectively rotationally restricted in a condition in which the wire 12r is applied with the tension greater than the predetermined value.

<Modified Forms>

Further, the present invention is not limited to the embodiment described above and can be modified without departing from the scope of the present invention. For example, in the wheelchair securing device 10 exemplified in the present embodiment, the front, rear, right and left reels 30f, 30r, 30y and 30z are rotated in the taking-up directions by the drive portion 50 having the motor 52 and the gear mechanism 40. Further, the reels 30f, 30r, 30y and 30z are rotationally locked by the drive portion 50 and the gear mechanism 40. However, the present invention can be applied to a wheelchair securing device in which the front, rear, right and left reels 30f, 30r, 30y and 30z can be rotated in the taking-up directions by spring forces instead of the drive portion 50 having the motor 52 and the gear mechanism 40, and in which a locking mechanism of the reels 30f, 30r, 30y and 30z can be separately provided.

Further, in the present embodiment, the slide member 62 of the rotation restraining mechanism 60 has the teeth portion 65 that is configured to mesh with the reel gear 34 of the reels 30f, 30r, 30y and 30z, so that the wheelchair K can be restricted from moving rearwardly. However, the slide member 62 can be newly provided with a teeth portion that is configured to mesh with the reel gear 34 of the right rear reel 30z, so that the wheelchair K can be restricted from moving forwardly.

Further, the wires 12f, 12r, 12y and 12z are exemplified as the retaining members. However, belts or other such members can be used instead of the wires 12f, 12r, 12y and 12z. Further, belts and the wires 12f, 12r, 12y and 12z can be used in combination.

Further, in the present embodiment, at securing of the wheelchair K, the motor 52 can stop when the rotation torque applied to the motor 52 of the drive portion 50 reaches the predetermined value, so that the front, rear, right and left reels 30f, 30r, 30y and 30z can be rotationally locked. However, instead of providing with such a rotationally locking mechanism, it is possible to provide, for example, a retractor or other such devices, so that the wires 12f, 12r, 12y and 12z as the retaining members can be constantly biased in the taking-up directions.

Embodiment 2

In the following, a wheelchair securing device according to Embodiment 2 of the present invention will be described with reference to FIGS. 5 to 12. The wheelchair securing device according to the present embodiment is a device for securing a wheelchair to a floor portion in a vehicle cabin of a vehicle.

Further, forward and rearward, rightward and leftward, and upward and downward in the drawings respectively correspond to forward and rearward, rightward and leftward, and upward and downward of the vehicle. Further, forward and rearward, rightward and leftward, and upward and downward referred to in the specification also correspond to forward and rearward, rightward and leftward, and upward and downward of the vehicle.

<Outline of Wheelchair Securing Device 10>

Figure 5:
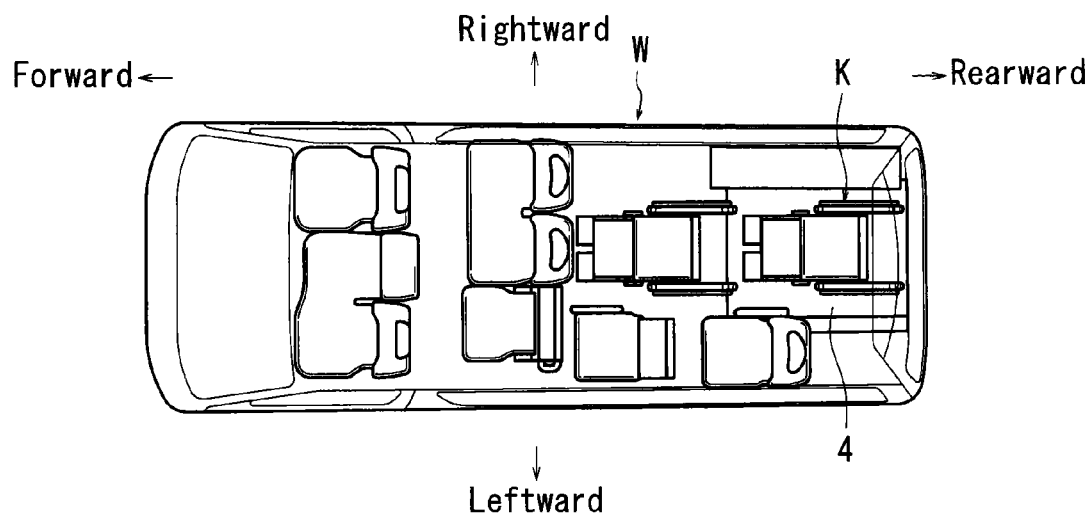
FIG. 5 is a plan view of a vehicle cabin of a vehicle having a wheelchair securing device according to Embodiment 2 of the present invention.
Figure 6:
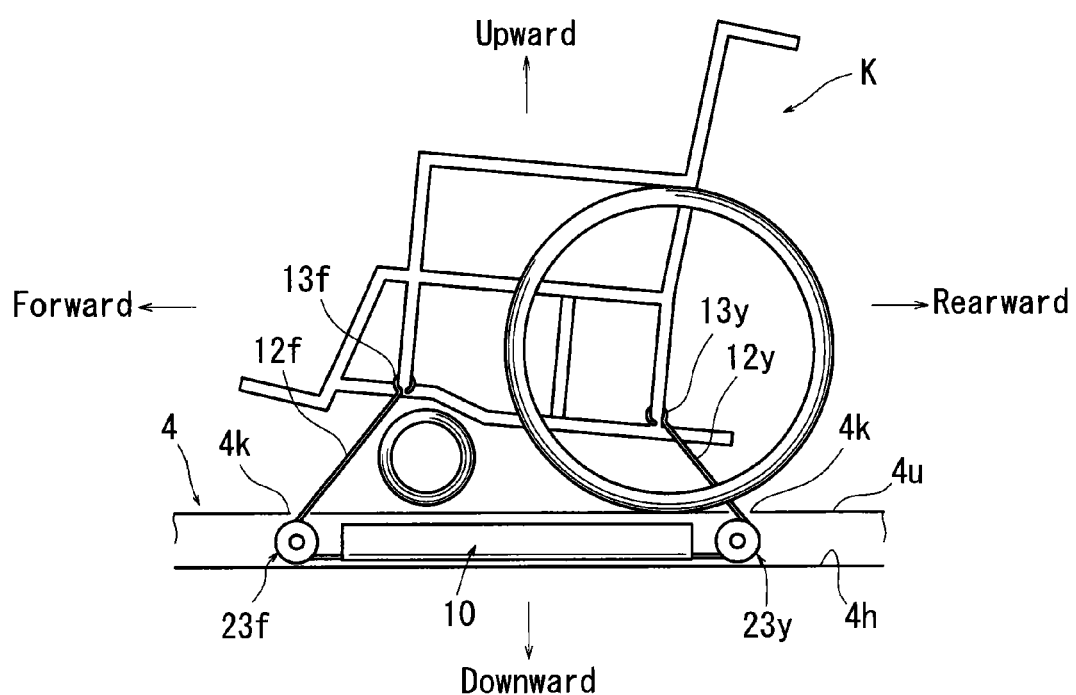
FIG. 6 is a schematic side view illustrating an operation of the wheelchair securing device according to Embodiment 2 of the present invention.

A wheelchair securing device 10 is a device for securing a wheelchair K to a floor position in a vehicle cabin of a vehicle W. As shown in FIGS. 5 and 6, the wheelchair securing device 10 is received in a platform 4 of a wheelchair lifter (not shown) that is disposed in a floor portion of the vehicle cabin. That is, formed in a predetermined position of the platform 4 is a recess 4h capable of receiving the wheelchair securing device 10 therein. An opening of the recess 4h is configured to be covered by a platform surface 4u.

Further, it is also possible to form a recess (not shown) capable of receiving the wheelchair securing device 10 therein in a predetermined position of the floor portion of the vehicle cabin, so that an opening of the recess can be covered by a floor plate.

Figure 7:
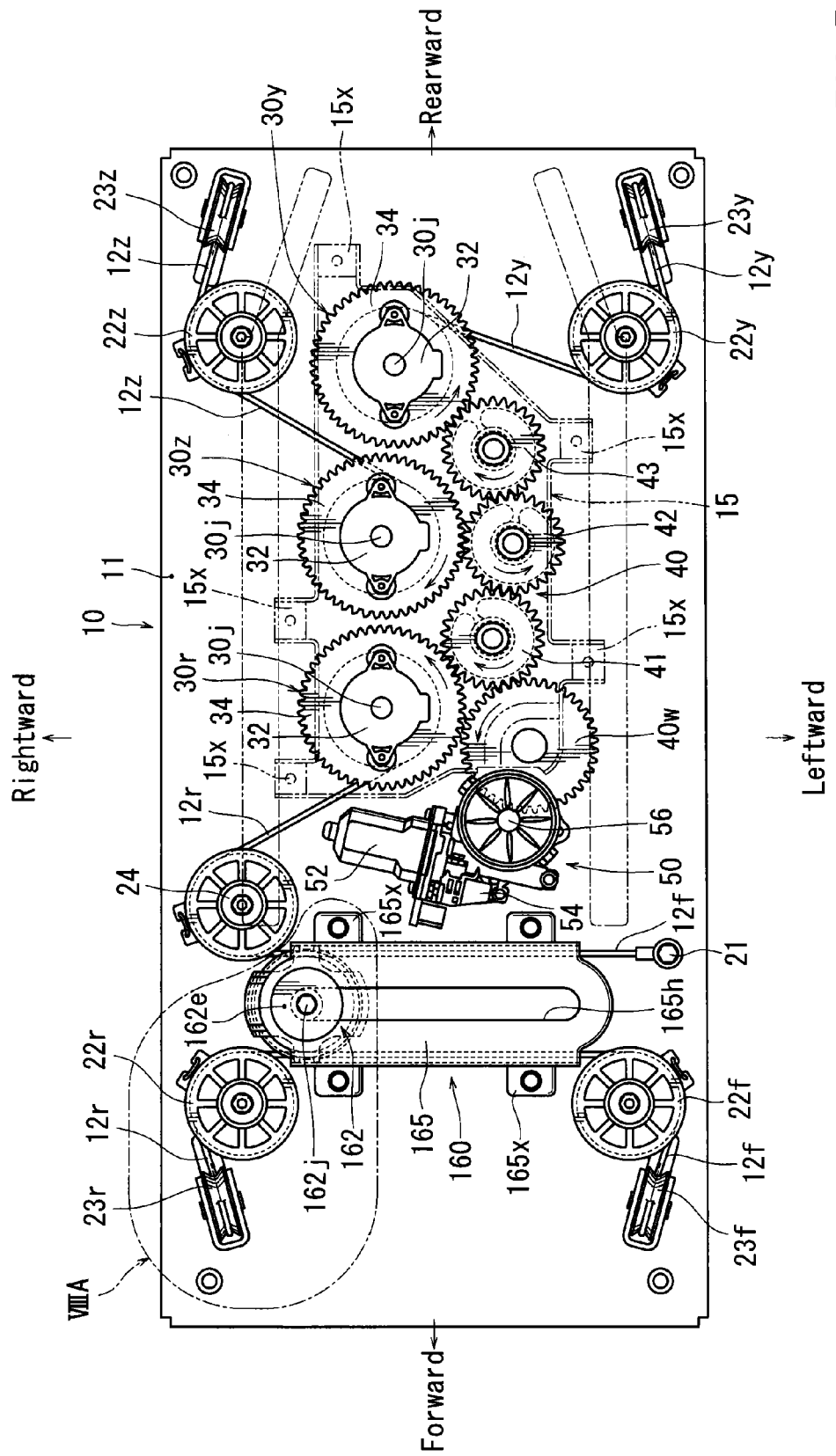
FIG. 7 is a plan view of the wheelchair securing device according to Embodiment 2 of the present invention.
Figure 8:
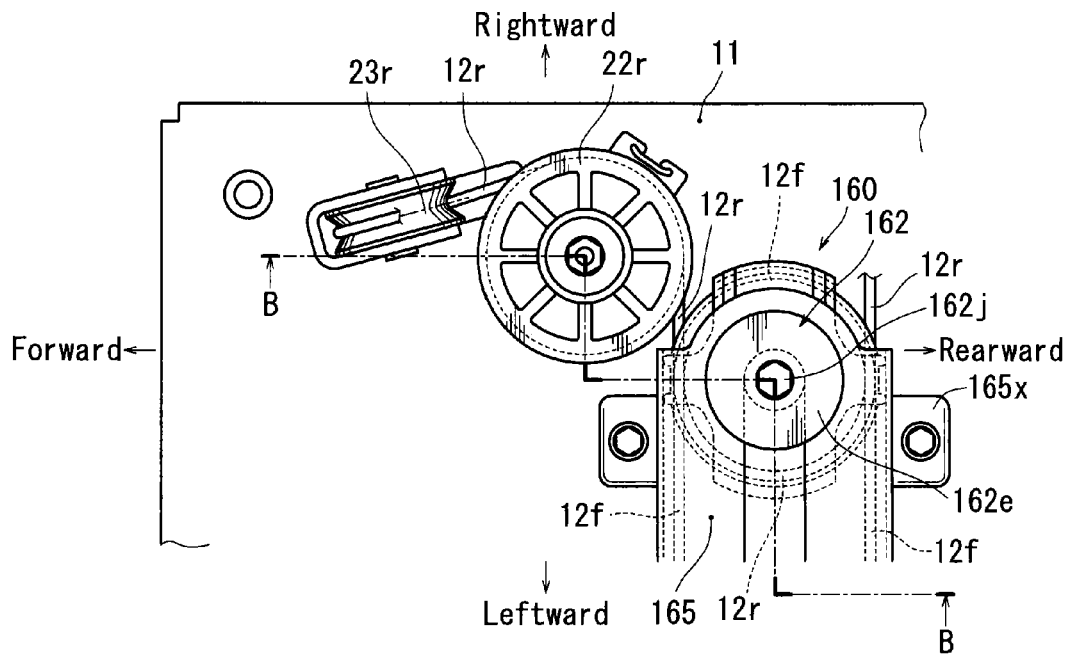
FIG. 8 (A) is an enlarged view of a portion shown by arrow VIIIA in FIG. 7.
Figure 8:
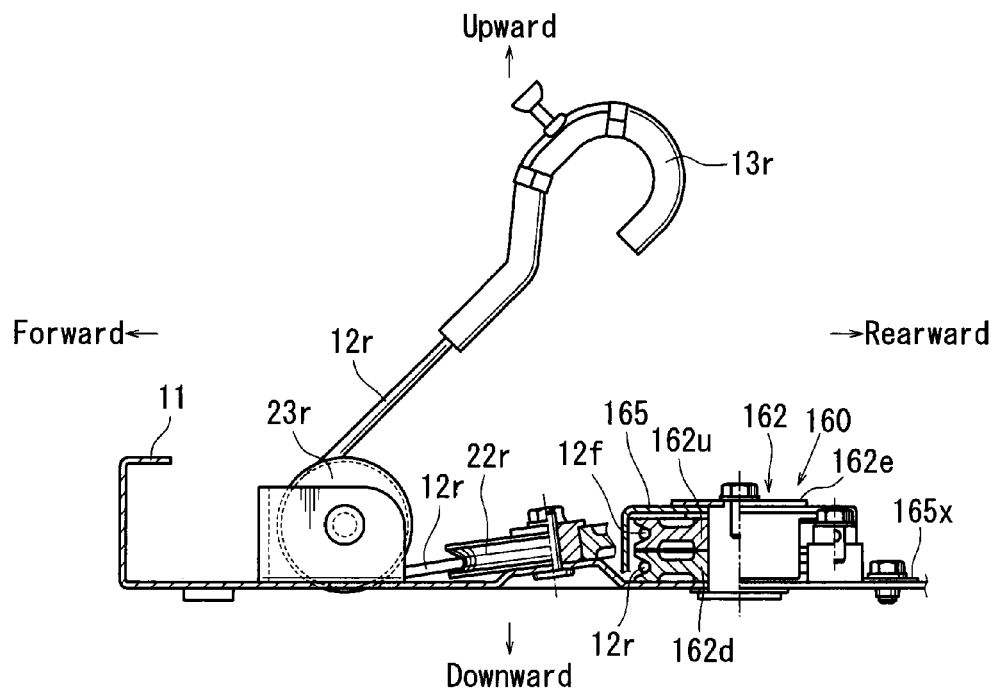

As shown in FIG. 7, the wheelchair securing device 10 includes three sets of reels 30r, 30y and 30z, a gear mechanism 40 and a drive portion 50, a tension balancing mechanism 160, and a rectangular base 11 that is elongated in a longitudinal direction of the vehicle. The reels 30r, 30y and 30z are respectively configured to be capable of taking up and paying out front, rear, right and left wires 12f, 12r, 12y and 12z. The gear mechanism 40 and the drive portion 50 are constructed to be capable of rotating the reels 30r, 30y and 30z in taking-up directions and capable of rotationally locking the same. The tension balancing mechanism 160 is configured to balance tensions of the right and left front side wires 12f and 12r. The rectangular base 11 is configured to support the reels 30r, 30y and 30z, the gear mechanism 40, the drive portion 50, the tension balancing mechanism 160, and additional members. Further, the base 11 is secured to the platform 4 of the wheelchair lifter or the floor portion of the vehicle cabin.

The base 11 corresponds to a vehicle side of the present invention.

The left front side wire 12f (which will be hereinafter referred to as the left front wire 12f) is a wire restricting backward movement of a left front portion of the wheelchair K. A hook 13f (FIG. 6) to be hooked on the left front portion of the wheelchair K is secured to a distal end of the wire 12f. As shown in FIG. 7, a proximal end portion of the left front wire 12f is secured to a left end of the base 11 via a securing member 21. Further, an intermediate portion of the left front wire 12f is applied to a sliding pulley 162 (which will be hereinafter described) of the tension balancing mechanism 160, a left rear horizontal pulley 22y and a left front vertical pulley 23f before it is pulled out upwardly from an upper side of the platform surface 4u via a rectangular opening 4k formed in the platform surface 4u.

The right front side wire 12r (which will be hereinafter referred to as the right front wire 12r) is a wire restricting backward movement of a right front portion of the wheelchair K. A hook 13r (FIG. 8(B)) to be hooked on the right front portion of the wheelchair K is secured to a distal end of the wire 12r. As shown in FIG. 7, the right front wire 12r is drawn from the right front reel 30r, and an intermediate portion thereof is applied to an intermediate horizontal pulley 24, the sliding pulley 162 of the tension balancing mechanism 160, a right front horizontal pulley 22r and a right front vertical pulley 23r before it is pulled out upwardly from the upper side of the platform surface 4u via a rectangular opening 4k formed in the platform surface 4u.

The left rear side wire 12y (which will be hereinafter referred to as the left rear wire 12y) is a wire restricting forward movement of a left rear portion of the wheelchair K. A hook 13y (FIG. 6) to be hooked on a left rear portion of the wheelchair K is secured to a distal end of the wire 12y. The left rear wire 12y is drawn from the left rear reel 30y, and is then applied to a left rear horizontal pulley 22y and a left rear vertical pulley 23y before it is pulled out upwardly from the upper side of the platform surface 4u via a rectangular opening 4k formed in the platform surface 4u.

The right rear side wire 12z (which will be hereinafter referred to as the right rear wire 12z) is a wire restricting forward movement of a right rear portion of the wheelchair K. A hook (not shown) to be hooked on a right rear portion of the wheelchair K is secured to a distal end of the wire 12z. The right rear wire 12z is drawn from the right rear reel 30z, and is then applied to a right rear horizontal pulley 22z and a right rear vertical pulley 23z before it is pulled out upwardly from the upper side of the platform surface 4u via a rectangular opening 4k formed in the platform surface 4u.

The wires 12f, 12r, 12y and 12z correspond to the retaining members of the present invention.

<Regarding Tension Balancing Mechanism 160>

The tension balancing mechanism 160 is a mechanism that is configured to balance the tensions of the left front wire 12f and the right front wire 12r, and has the sliding pulley 162, a bracket 165 that is configured to horizontally slidably support the sliding pulley 162 on the base 11, and a securing mechanism (not shown) that is configured to prohibit horizontal sliding of the sliding pulley 162.

As shown in a vertical sectional view of FIG. 8(B), the sliding pulley 162 is composed of an upper pulley portion 162u and a lower pulley portion 162d that are coaxially connected together and have the same outer diameter dimension. The intermediate portion of the left front wire 12f is applied to the upper pulley portion 162u of the sliding pulley 162 from the right. Further, the intermediate portion of the right front wire 12r is applied to the lower pulley portion 162d from the left.

The upper pulley portion 162u corresponds to a first pulley portion of the present invention. Conversely, the lower pulley portion 162d corresponds to a second pulley portion of the present invention.

The bracket 165 is a support base that is capable of horizontally supporting the sliding pulley 162 to be rotatable about an axis thereof such that the sliding pulley 162 can slide to the left or to the right on the base 11. The bracket 165 is formed as a laterally elongated ridge-shaped member that has a flattened substantially reverse U-shape in longitudinal section. Further, support plate portions 165x are provided on circumferentially four positions of the bracket 165 and are bolted on the base 11.

The sliding pulley 162 is received in a ridge-shaped portion of the bracket 165. Further, formed in an upper surface of the bracket 165 is a laterally extending slot-shaped elongated hole 165h through which an upper end portion of a center shaft 162j of the sliding pulley 162 is passed. Further, formed in the base 11 is a slot-shaped elongated hole (not shown) through which a lower end portion of the center shaft 162j of the sliding pulley 162. The elongated hole is positioned opposite to the slot-shaped elongated hole 165h of the bracket 165, Thus, when the tension of the right front wire 12r becomes greater than the tension of the left front wire 12f, the sliding pulley 162 is pulled by the right front wire 12r, so as to slide to the right along the slot-shaped elongated hole 165h of the bracket 165. To the contrary, when the tension of the left front wire 12f becomes greater than the tension of the right front wire 12r, the sliding pulley 162 slides to the left along the slot-shaped elongated hole 165h of the bracket 165. Further, when the tension of the right front wire 12r and the tension of the left front wire 12f become equal to each other, the sliding pulley 162 is held stationary.

The securing mechanism is a mechanism that is capable of securing the sliding pulley 162 in position with respect to the bracket 165 when the tension of the right front wire 12r and the tension of the left front wire 12f become equal to each other. The securing mechanism is mainly composed of a disc 162e (for example, FIG. 8(A)) and an electromagnet (not shown). The disc 162e is attached to the upper end portion of the central shaft 162j of the sliding pulley 162 and is positioned in an outer side of the slot-shaped elongated hole 165h. The electromagnet is intended to attach the disc 162e to the upper surface of the bracket 165.

<Regarding Reels 30r, 30y and 30z>

The right front reel 30r, the left rear reel 30y and the right rear reel 30z are composed of disc-shaped reel main bodies 32 that are respectively configured to take up and pay out the wires 12r, 12y and 12z, and reel gears 34 that are positioned coaxially with the reel main bodies 32. The reel main bodies 32 and the reel gears 34 are respectively integrated with each other in rotating directions.

The right front reel 30r is positioned on the base 11 in a front side central portion thereof while it is arranged parallel to the base 11. The right front reel 30r is constructed to take up the right front wire 12r by left rotation thereof. The right rear reel 30z is positioned on the base 11 behind the right front reel 30r while it is arranged parallel to the base 11. The right rear reel 30z is configured to take up the right rear wire 12z by right rotation thereof. Similarly, the left rear reel 30y is positioned on the base 11 behind the right rear wheel 30z while it is arranged parallel to the base 11. The left rear reel 30y is constructed to take up the left rear wire 12y by left rotation thereof.

Lower ends of rotation central shafts 30j of the right front reel 30r, the left rear reel 30y and the right rear reel 30z are respectively fitted into bearing holes (not shown) formed in the base 11. Conversely, upper ends of the rotation central shafts 30j are respectively fitted into bearing holes (not shown) formed in a gear bracket 15 (chain double-dashed line) that is provided parallel to the base 11. Further, the gear bracket 15 has leg-shaped support portions 15x that are formed in a plurality of positions on a circumferential periphery thereof. The support portions 15x are bolted on the base 11.

<Regarding Gear Mechanism 40 and Drive Portion 50>

As shown in FIG. 7, the drive portion 50 has a motor 52, and a speed reduction mechanism 54 that is capable of amplifying a rotative force of the motor 52.

The drive portion 50 is securely connected to the base 11 such that an output shaft 56 thereof can be vertically directed.

The output shaft 56 has an output gear (not shown) attached thereto. The output gear meshes with an input gear 40w of the gear mechanism 40.

The gear mechanism 40 is a mechanism for transmitting a rotative force of the output shaft 56 of the drive portion 50 to the right front reel 30r, the left rear reel 30y and the right rear reel 30z, and is composed of the input gear 40w previously described, a first gear 41, a second gear 42 and a third gear 43. Further, the input gear 40w, the first gear 41, the second gear 42 and the third gear 43 are rotatably held horizontally between the base 11 and the gear bracket 15. Further, the first gear 41, the second gear 42 and the third gear 43 are provided with clutch mechanisms (not shown) for enabling and disabling the transmission of the rotative force.

As shown in FIG. 7, the input gear 40w of the gear mechanism 40 meshes with the first gear 41. The first gear 41 meshes with the reel gear 34 of the right front reel 30r and the second gear 42. The second gear 42 meshes with the reel gear 34 of the right rear reel 30z and the third gear 43. The third gear 43 meshes with the reel gear 34 of the left rear reel 30y.

According to the construction described above, when the drive portion 50 is actuated to rotate the input gear 40w of the gear mechanism 40 to the left, as shown by arrows in FIG. 7, the first gear 41 rotates to the right, the second gear 42 rotates to the left, the third gear 43 rotates to the right. As a result, the reel gears 34 (the reel main bodies 32) of the right front reel 30r, the left rear reel 30y and the right rear reel 30z meshing with the first to third gears 41, 42 and 43 can respectively rotate in the taking-up directions of the wires 12r, 12y and 12z.

Further, the first to third gears 41, 42 and 43 are gears of the same teeth number. Also, the reel gears 34 of the right front reel 30r, the left rear reel 30y and the right rear reel 30z are gears of the same teeth number. Therefore, upon actuation of the drive portion 50, the right front reel 30r, the left rear reel 30y and the right rear reel 30z can rotate at the same speed in the taking-up directions. Thereafter, when the right front wire 12r, the right rear wire 12z and the left rear wire 12y are taken up to limit positions thereof and then rotation torque applied to the motor 52 of the drive portion 50 reaches a predetermined value, the motor 52 stops, so that the right front reel 30r, the left rear reel 30y and the right rear reel 30z can be rotationally locked. Further, when the clutch mechanisms of the first to third gears 41, 42 and 43 are moved toward positions disabling the transmission of the rotative force and are positioned therein, the rotation lock of the right front reel 30r, the left rear reel 30y and the right rear reel 30z is released. As a result, the gear mechanism 40 is changed to a free condition, so that the left front wire 12f, the right front wire 12r, the right rear wire 12z and the left rear wire 12y can be drawn.

<Regarding Operation of Wheelchair Securing Device 10>

Next, an operation of the wheelchair securing device 10 described above will be described with reference to FIGS. 9 to 12.

Figure 9:
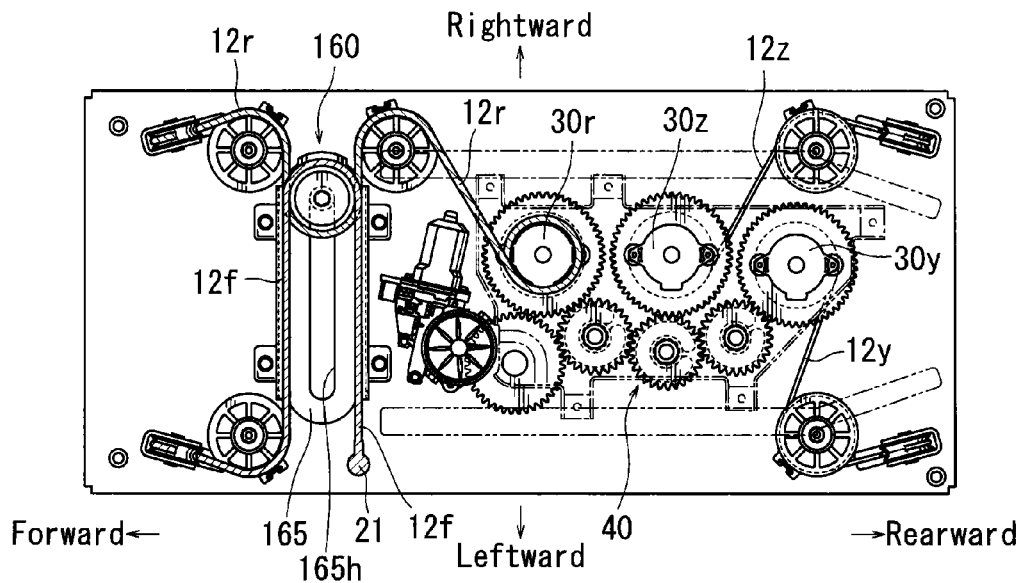
FIG. 9 is a schematic plan view illustrating an operation of a tension balancing mechanism of the wheelchair securing device.
Figure 10:
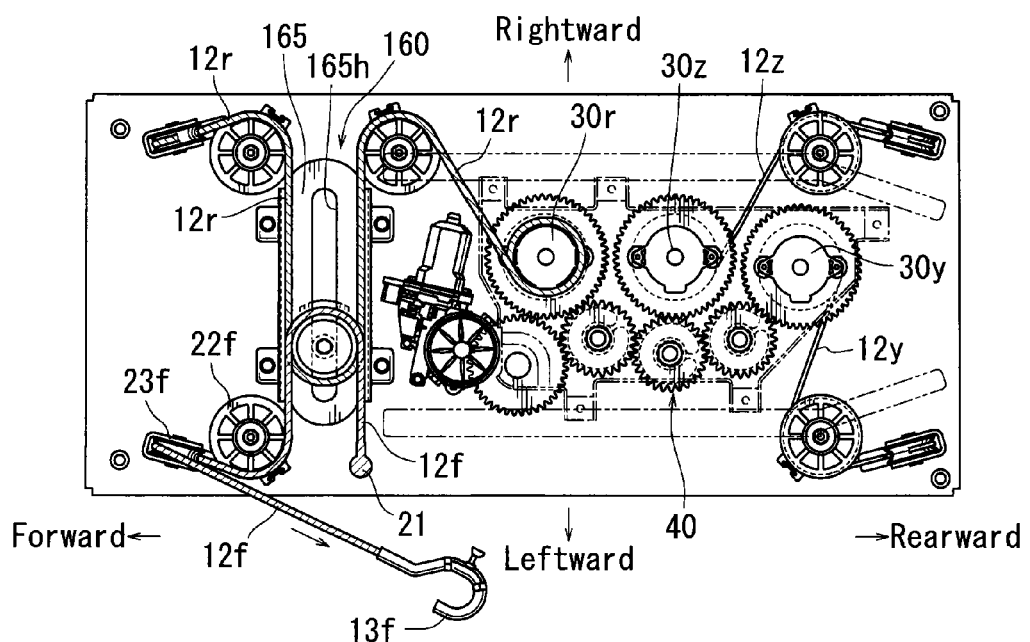
FIG. 10 is a schematic plan view illustrating the operation of the tension balancing mechanism of the wheelchair securing device.

First, as shown in FIG. 10, in a condition in which the wheelchair K is positioned in a regular position on the platform surface 4u, the left front wire 12f is drawn upwardly by holding the hook 13f by hand. When the left front wire 12f is drawn, the sliding pulley 162 of the tension balancing mechanism 160 is pulled to the left due to the tension of the left front wire 12f, so that the sliding pulley 162 moves to the left from a position shown in FIG. 9 along the slot-shaped elongated hole 165h of the bracket 165. As a result, the right front wire 12r is drawn from the right font reel 30r by an amount corresponding to movement of the sliding pulley 162.

In this condition, the hook 13f of the left front wire 12f is hooked on the left front portion of the wheelchair K (FIG. 6).

Figure 11:
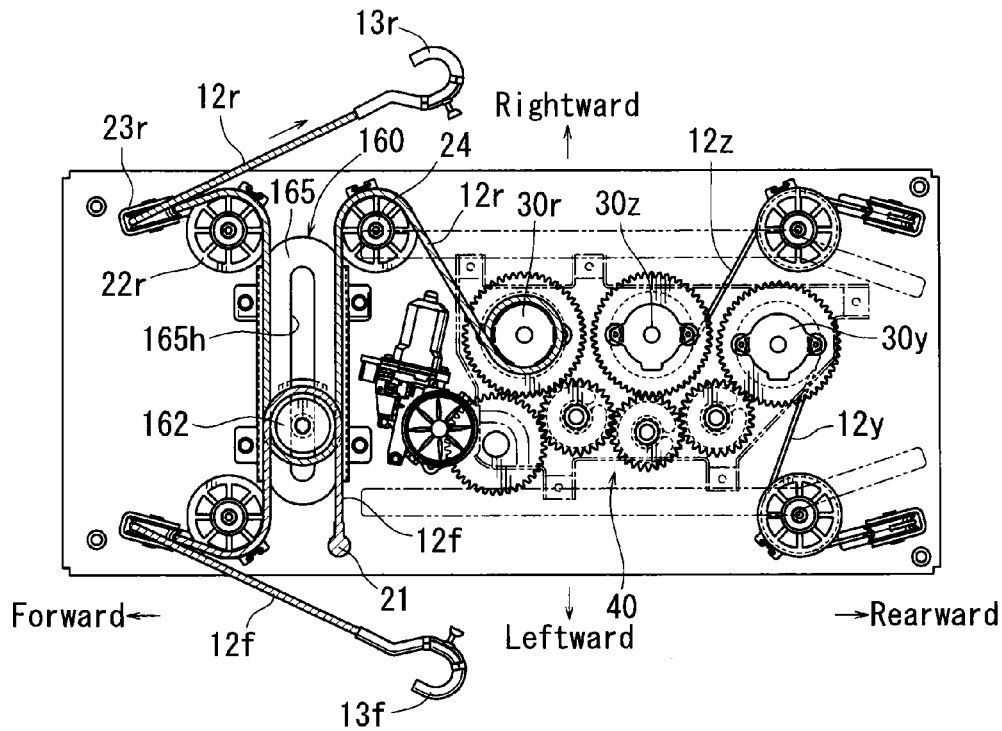
FIG. 11 is a schematic plan view illustrating the operation of the tension balancing mechanism of the wheelchair securing device.

Next, as shown in FIG. 11, the right front wire 12r is drawn from the right front reel 30r via the right front vertical pulley 23r, the right front horizontal pulley 22r and the sliding pulley 162 by holding the hook 13r by hand. Thereafter, the hook 13r is hooked on the right front portion of the wheelchair K.

Similarly, the left rear wire 12y and the right rear wire 12z are respectively drawn from the left rear reel 30y and the right rear wire 12z. Thereafter, the hooks such as the hook 13y are respectively hooked on the left rear portion and the right rear portion of the wheelchair K.

Figure 12:
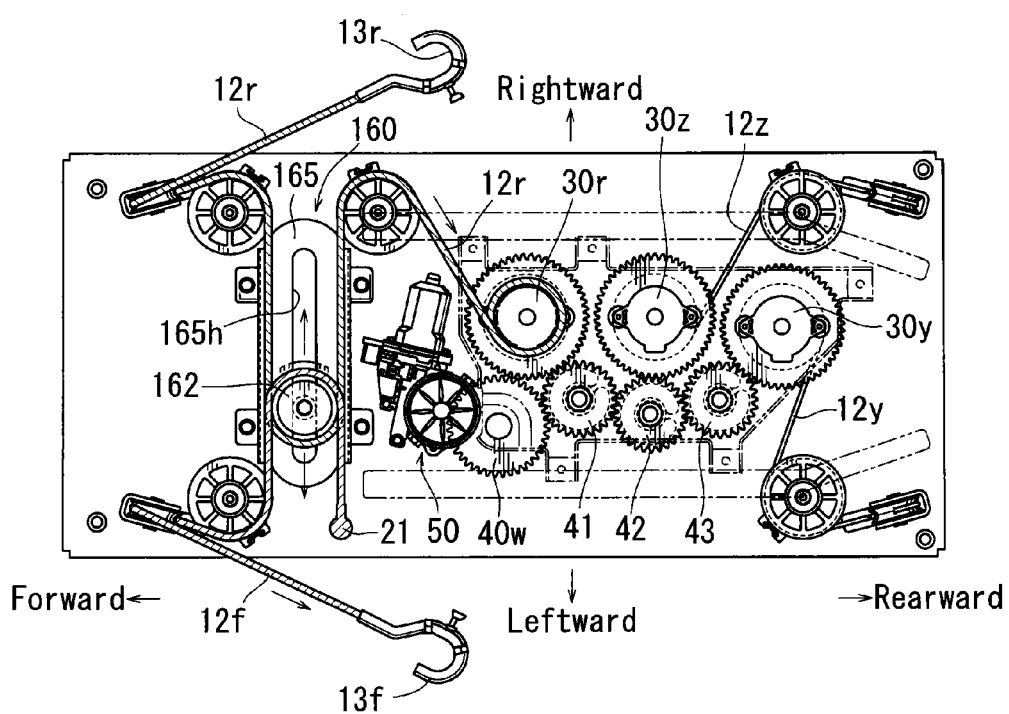
FIG. 12 is a schematic plan view illustrating the operation of the tension balancing mechanism of the wheelchair securing device.

Subsequently, a take-up switch (not shown) provided to the vehicle W is operated. As a result, as shown in FIG. 12, the drive portion 50 is actuated, so that the drive portion 50 can rotate the input gear 40w, the first gear 41, the second gear 42 and the third gear 43 of the gear mechanism 40. Thus, the right front reel 30r, the left rear reel 30y and the right rear reel 30z can rotate in the taking-up directions. Further, the sliding pulley 162 of the tension balancing mechanism 160 is constructed to be slidable in a lateral direction. Therefore, as shown in FIG. 12, when the right front wire 12r is taken up by the right front reel 30r, the sliding pulley 162 is held in a position in which the tension of the right front wire 12r and the tension of the left front wire 12f are equal to each other. Thereafter, when the right front wire 12r, the left rear wire 12y and the right rear wire 12z are taken up to the limit positions thereof and then the rotation torque applied to the motor 52 of the drive portion 50 reaches the predetermined value, the motor 52 stops, so that the right front reel 30r, the left rear reel 30y and the right rear reel 30z can be rotationally locked. Further, the securing mechanism of the tension balancing mechanism 160 is operated, so that the sliding pulley 162 is maintained in the position. Thus, the wheelchair K is constrained from front, rear, right and left sides thereof by the front, rear, right and left wires 12f, 12r, 12y and 12z, so that securing of the wheelchair K can be completed.

Conversely, in order to release the securing of the wheelchair K, after the rotation lock of the wheelchair securing device 10 is released, the front, rear, right and left wires 12f, 12r, 12y and 12z are drawn. Thus, the hooks 13f, 13r, 13y and 13z can respectively be detached from the wheelchair K.

Further, when the hooks 13f, 13r, 13y and 13z are respectively detached from the wheelchair K, the right front wire 12r, the left rear wire 12y and the right rear wire 12z can respectively be taken up by the right front reel 30r, the left rear reel 30y and the right rear reel 30z by spring forces. As a result, as shown in FIG. 9, the sliding pulley 162 of the tension balancing mechanism 160 slides to the right due to the tension of the right front wire 12r, so that the left front wire 12f can be taken up.

<Advantages of the Wheelchair Securing Device 10 According to the Present Embodiment>

In the wheelchair securing device 10 according to the present embodiment, when the right front reel 30r is rotated in the taking-up direction while the hook 13f of the left front wire 12f and the hook 13r of the right front wire 12r are hooked on the wheelchair K, the sliding pulley 162 is pulled to the right due to the tension that is generated when the right front wire 12r is drawn, so that the left front wire 12f can be pulled by the sliding pulley 162. That is, when the right front reel 30r rotates in the taking-up direction, the right front wire 12 is drawn. At the same time, the sliding pulley 162 is pulled to the right by the tension of the right front wire 12r, so that the left front wire 12f can be drawn. The right front reel 30r stops after it is rotated by a predetermined angle. As a result, the sliding pulley 162 is maintained in the position in which the tensions of the right and left wires 12f and 12r are equal to each other, so that the wheelchair K can be secured to the vehicle W.

That is, in a condition in which the wheelchair K is secured to the vehicle W, the tensions of the right and left wires 12f and 12r can be equal to each other, so that the wheelchair K can be secured to the vehicle W from the right and left in a well-balanced manner.

The sliding pulley 162 is composed of the upper pulley portion 162u to which the left front wire 12f is applied and the lower pulley portion 162d to which the right front wire 12r is applied, which pulley portions are superimposed and coaxially connected together. Therefore, the right and left wires 12f and 12r applied to the sliding pulley 162 cannot interfere with each other.

Further, the tension balancing mechanism 160 is provided with the securing mechanism for securing the sliding pulley 162 to the bracket 165. Therefore, in the condition in which the wheelchair K is secured in position by the wheelchair securing device 10, if one of the tensions of the right and left wires 12f and 12r can be greater than the other by, for example, abrupt turn of the vehicle W, the sliding pulley 162 can be prevented from moving.

<Modified Forms>

Further, the present invention is not limited to the embodiment described above and can be modified without departing from the scope of the present invention. For example, in the present embodiment, the tension balancing mechanism 160 for balancing the tensions of the left front wire 12f and the right front wire 12r is provided in a front portion of the wheelchair securing device 10. However, it is possible to additionally provide the tension balancing mechanism 160 in a rear portion of the vehicle securing device 10, so as to provide the same in each of the front and rear portions thereof.

Further, in the present embodiment, the proximal end portion of the left front wire 12f is secured to the base 11, and the right front wire 12r can be taken up by the right front reel 30r. However, it is also possible to be constructed such that a proximal end portion of the right front wire 12r can be secured to base 11 and that the left front wire 12f can be taken up by a reel.

Further, in the present embodiment, the wires are exemplified as the retaining members. However, the wires can be replaced with belts or other such members.

The embodiment can be expressed as follows.

A wheelchair securing device that includes right and left cord-like retaining members having hooks, and reels attached to a vehicle and capable of taking up the retaining members, the reels being rotated in taking-up directions of the retaining members in a condition in which the hooks of the right and left retaining members are respectively hooked on right and left sides of a wheelchair, so as to secure the wheelchair to the vehicle, which includes a sliding pulley to which an intermediate portion of the left retaining member and an intermediate portion of the right retaining member are applied from opposite directions, the sliding pulley being configured to slide to the right when the tension of the right retaining member is greater than the tension of the left retaining member and to slide to the left when the tension of the left retaining member is greater than the tension of the right retaining member, a reel that is configured to taking up one of the right and left retaining members, and a securing member for securing a proximal end portion of the other of the right and left retaining members to the vehicle.

The sliding pulley may include a first pulley portion to which one of the right and left retaining members is applied and a second pulley portion to which the other of the right and left retaining members is applied. The first and second pulley portions may be superimposed and coaxially connected together.

The wheelchair securing device may further include a securing mechanism that is configured to secure the sliding pulley to the vehicle so as to unslidably retain the same.

According to the embodiment, the tensions of the right and left retaining members can be equal to each other, so that the wheelchair can be secured to the vehicle from the right and left in a well-balanced manner.

The invention claimed is:

1. A wheelchair securing device that is configured such that in a condition in which a plurality of cord-like retaining members having hooks are respectively drawn from reels and in which the hooks are hooked on a wheelchair, the reels are rotated in taking-up directions of the retaining members and then are rotationally locked to secure the wheelchair to a vehicle, comprising:
   a rotation restraining mechanism that is configured to restrict rotation of the reels using a tension of a respective one of the retaining members when in a condition in which the reels are not rotationally locked, the wheelchair receives a force caused by acceleration of the vehicle and forces the retaining members to be drawn from the reels,
   wherein the reels have reel gears that are positioned coaxially therewith and are integrated therewith, wherein the reel gears are connected to a motor via a rotative force transmission mechanism, wherein when the motor is actuated, the reels are rotated in taking-up directions of the retaining members, wherein when the motor is stopped, the reels are rotationally locked, and wherein when connection of the reel gears and the motor via the rotative force transmission mechanism is released, the reels can be rotationally unlocked.

2. The wheelchair securing device as defined in claim 1, wherein the rotation restraining mechanism comprises:
   a slide member having a teeth portion that is capable of meshing with the reel gears, and configured to be slidable between a mesh position and a retract position,
   a spring member biasing the slide member toward the retract position, and
   a hooking portion formed in the slide member and configured such that the retaining members can be hooked thereon,
   wherein in a condition in which one of the retaining members is applied with a tension greater than a spring force of the spring member, the slide member slides toward the mesh position against the spring force of the spring member due to the tension of the retaining member, so that the teeth portion can mesh with one of the reel gears to rotationally restrict the reels.

3. The wheelchair securing device as defined in claim 1 further comprising a sliding pulley to which an intermediate portion of a left one of the retaining members and an intermediate portion of a right one of the retaining members are applied from opposite directions, the sliding pulley being configured to slide to the right when a tension of the right retaining member is greater than a tension of the left retaining member and to slide to the left when the tension of the left retaining member is greater than the tension of the right retaining member,
   a reel that is configured to taking up one of the right and left retaining members, and
   a securing member for securing a proximal end portion of the other of the right and left retaining members to the vehicle.

4. The wheelchair securing device as defined in claim 3, wherein the sliding pulley comprises a first pulley portion to which one of the right and left retaining members is applied and a second pulley portion to which the other of the right and left retaining members is applied, the first and second pulley portions being superimposed and coaxially connected together.

5. The wheelchair securing device as defined in claim 3 further comprising a securing mechanism that is configured to secure the sliding pulley to the vehicle so as to unslidably retain the same.

* * * * *